US 12,552,420 B2

(12) United States Patent
Heggebø et al.

(10) Patent No.: US 12,552,420 B2
(45) Date of Patent: Feb. 17, 2026

(54) SERVICE VEHICLE WITH A VEHICLE PEN

(71) Applicant: Autostore Technology AS, Nedre Vats (NO)

(72) Inventors: Jørgen Djuve Heggebø, Olen (NO); Kenneth Müller, Vormedal (NO)

(73) Assignee: AutoStore Technology AS, Nedre Vats (NO)

( * ) Notice: Subject to any disclaimer, the term of this patent is extended or adjusted under 35 U.S.C. 154(b) by 413 days.

(21) Appl. No.: 18/030,408

(22) PCT Filed: Nov. 15, 2021

(86) PCT No.: PCT/EP2021/081654
§ 371 (c)(1),
(2) Date: Apr. 5, 2023

(87) PCT Pub. No.: WO2022/106346
PCT Pub. Date: May 27, 2022

(65) Prior Publication Data
US 2023/0373537 A1 Nov. 23, 2023

(30) Foreign Application Priority Data
Nov. 23, 2020 (NO) .................................. 20201280

(51) Int. Cl.
*B61C 13/04* (2006.01)
*B61D 19/00* (2006.01)
(Continued)

(52) U.S. Cl.
CPC .............. *B61C 13/04* (2013.01); *B61D 19/00* (2013.01); *B65G 1/0478* (2013.01);
(Continued)

(58) Field of Classification Search
CPC .................. B65G 1/065; B65G 1/1375; B65G 2201/0235; B65G 1/0414; B65G 1/0464;
(Continued)

(56) References Cited

U.S. PATENT DOCUMENTS

| 5,141,380 A | 8/1992 | Kato et al. | |
| 11,167,924 B2 * | 11/2021 | Borders | ................. B65G 67/02 |

(Continued)

FOREIGN PATENT DOCUMENTS

| CA | 3160041 A1 * | 6/2021 | ............. B62D 63/04 |
| CN | 208666168 U | 3/2019 | |

(Continued)

OTHER PUBLICATIONS

Charles Thibaut, Extended European Search Report for European patent application No. EP24221741.2, dated Apr. 10, 2025, 11 pages, published by the European Patent Office, Munich, Germany.

(Continued)

*Primary Examiner* — Paul N Dickson
*Assistant Examiner* — Maxwell L Meshaka
(74) *Attorney, Agent, or Firm* — Baker Botts L.L.P.

(57) ABSTRACT

A service vehicle operates on a rail system of a storage and retrieval grid. The service vehicle is configured for retrieving a remotely operated vehicle for service. The service vehicle includes a first vehicle area in which the remotely operated vehicle can be received by the service vehicle while the remotely operated vehicle is still on the rail system, and a second vehicle area in which the remotely operated vehicle can be supported by the service vehicle for servicing. The first vehicle area is configured as a vehicle pen for holding the remotely operated vehicle before entry to the second vehicle area. The first vehicle area is linked to the second vehicle area for passage of the remotely operated vehicle via the vehicle pen. The vehicle pen includes an (Continued)

entry barrier to regulate entry of the remotely operated vehicle into the service vehicle and the vehicle pen, and an exit barrier on exit from the vehicle pen into the second vehicle area to regulate the passage of the remotely operated vehicle through the first vehicle area and into the second vehicle area.

14 Claims, 9 Drawing Sheets

(51) Int. Cl.
| | |
|---|---|
| *B65G 1/04* | (2006.01) |
| *E05F 15/70* | (2015.01) |
| *B61B 5/02* | (2006.01) |
| *E05B 81/56* | (2014.01) |
| *E05B 81/72* | (2014.01) |

(52) U.S. Cl.
CPC ............ *B65G 1/0492* (2013.01); *E05F 15/70* (2015.01); *B61B 5/02* (2013.01); *E05B 81/56* (2013.01); *E05B 81/72* (2013.01); *E05Y 2900/531* (2013.01)

(58) Field of Classification Search
CPC ....... B65G 1/0492; B65G 1/0478; B66F 9/19; B61C 13/04; E05Y 2900/531; B61D 19/00
See application file for complete search history.

(56) References Cited

U.S. PATENT DOCUMENTS

| | | | | |
|---|---|---|---|---|
| 11,691,635 | B2 * | 7/2023 | Austrheim | ........... B65G 1/0457 |
| | | | | 414/279 |
| 12,060,042 | B2 * | 8/2024 | Austrheim | ................ B60S 5/00 |
| 12,071,167 | B2 * | 8/2024 | Austrheim | ........... B65G 1/0492 |
| 12,151,894 | B2 * | 11/2024 | Austrheim | ............. B65G 47/02 |
| 12,214,960 | B2 * | 2/2025 | Austrheim | ........... B65G 1/0478 |
| 12,246,757 | B2 * | 3/2025 | Austrheim | ........... B65G 1/0464 |
| 2015/0066283 | A1 * | 3/2015 | Wurman | ............. G05D 1/0225 |
| | | | | 701/25 |
| 2019/0176323 | A1 | 6/2019 | Coady et al. | |
| 2020/0207546 | A1 * | 7/2020 | Borders | ................. B65G 67/02 |
| 2021/0086782 | A1 * | 3/2021 | Austrheim | ........... B65G 1/0492 |
| 2021/0269240 | A1 * | 9/2021 | Austrheim | ........... G05D 1/0011 |
| 2022/0061232 | A1 * | 3/2022 | Whelan | ................... A01K 67/30 |
| 2022/0097967 | A1 * | 3/2022 | Austrheim | ........... B65G 1/0492 |
| 2023/0014506 | A1 * | 1/2023 | Austrheim | ............. B62D 63/04 |
| 2023/0021155 | A1 * | 1/2023 | Fagerland | ............. B25J 9/0093 |
| 2023/0331242 | A1 * | 10/2023 | Austrheim | ............. B61B 13/00 |
| 2023/0373537 | A1 * | 11/2023 | Heggebø | ............. B61D 19/00 |
| 2024/0343229 | A1 * | 10/2024 | Austrheim | ................ B61B 5/02 |
| 2025/0115428 | A1 * | 4/2025 | Austrheim | ........... B65G 1/0464 |

FOREIGN PATENT DOCUMENTS

| | | | | |
|---|---|---|---|---|
| CN | 111465907 | A | 7/2020 | |
| EP | 0361178 | A1 | 4/1990 | |
| EP | 4069608 | B1 * | 6/2025 | ............. B62D 63/04 |
| JP | 2025020402 | A * | 2/2025 | ........... B65G 1/0492 |
| KR | 20220018583 | A * | 2/2022 | ........... B65G 1/0492 |
| KR | 102841465 | B1 * | 8/2025 | ................ B66F 9/19 |
| NO | 317366 | B1 | 10/2004 | |
| NO | 344889 | B1 * | 6/2020 | ............. G05D 1/692 |
| NO | 346266 | B1 * | 5/2022 | ............. B65G 1/065 |
| WO | 2014/075937 | A1 | 5/2014 | |
| WO | 2014/090684 | A1 | 6/2014 | |
| WO | 2015/140216 | A1 | 9/2015 | |
| WO | 2015/193278 | A1 | 12/2015 | |
| WO | 2018/146304 | A1 | 8/2018 | |
| WO | 2019/233632 | A1 | 12/2019 | |
| WO | WO-2019238673 | A1 * | 12/2019 | ............. B65G 65/23 |
| WO | 2020/144269 | A1 | 7/2020 | |
| WO | 2020/151866 | A1 | 7/2020 | |
| WO | 2020/200799 | A1 | 10/2020 | |
| WO | WO-2021239515 | A1 * | 12/2021 | ........... B65G 1/0464 |
| WO | WO-2022112228 | A1 * | 6/2022 | ........... B65G 1/0464 |

OTHER PUBLICATIONS

Nebojsa Markovic, Office Action for Norwegian Patent Application No. 20201280, dated Jun. 6, 2021, 3 pages, pub. by the Norwegian Industrial Property Office, Oslo, Norway.
Anh, Le Huy, Office Action in VN1202302758, mailed Jun. 27, 2025, 4 pages, Intellectual Property Office of Vietnam, Hanoi, Vietnam.
International Search Report issued in PCT/EP2021/081654 on May 23, 2022 (6 pages).
Written Opinion of the International Searching Authority issued in PCT/EP2021/081654 on May 23, 2022 (10 pages).
Written Opinion of the International Preliminary Examining Authority issued in PCT/EP2021/081654 on Sep. 12, 2022 (9 pages).
International Preliminary Report on Patentability from PCT/EP2021/081654 on Feb. 24, 2023 (19 pages).
Norwegian Search Report issued in NO 20201280 mailed on Jun. 6, 2021 (2 pages).
Thibaut, Charles, Office Action for European Patent Application No. 21843879.4, dated Jan. 16, 2025, 7 pages, pub. by the EPO, Rijswijk Netherlands.
Amornrat Sunthornpirat, Office Action for Thai Patent Application No. 2301003050, mailed Feb. 27, 2025, 6 pages inclusive of translation, pub. by the Thailand Intellectual Property Office, Nonthaburi, Thailand.
Zhu, Simin, Office Action in CN202180078494.3, mailed Dec. 15, 2025, 11 pages, The State Intellectual Property Office of the People's Republic of China, Beijing, China.
Takahashi, Takehiro, Office Action in JP2023528652, mailed Dec. 2, 2025, 6 pages, Japan Patent Office, Tokyo, Japan.

* cited by examiner

SERVICE VEHICLE WITH A VEHICLE PEN

The present invention relates to a service vehicle for operating on a rail system of a storage and retrieval grid. The service vehicle being configured for retrieving a remotely operated vehicle for service, wherein the service vehicle comprises a vehicle pen with a entry and exit barrier for regulating the passage of the remotely operated vehicle between a first and a second vehicle area of the service vehicle.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201,301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

When a remotely operated vehicle is malfunctioning on the rail system, a service vehicle may be needed to move onto the rail system and retrieve the malfunctioning vehicle for service. The service vehicle may be operated by a human operator which may in certain circumstances need to move around on the deck of the service vehicle by shutting down malfunctioning vehicle or provide on-site service to the malfunctioning vehicle. A dangerous situation may occur if the remotely operated vehicle moves unintentionally.

WO2019233632A1 relates to a service vehicle for movement on a rail system. The service vehicle comprises a container vehicle handling part for mechanical interacting with a container handling vehicle operating on the rail system, an operational part for controlling operations of the service vehicle and caterpillar tracks for allowing movement of the service. One disadvantage of WO2019233632A1 is that it does not preclude uncontrollable displacement of a remotely operated vehicle.

Thus, an objective of the present invention is to provide a safety arrangement for workers and equipment on a service vehicle.

Another objective of the present invention is to prevent a remotely operated vehicle to move uncontrollably.

SUMMARY OF THE INVENTION

The invention is directed to a service vehicle for operating on a rail system of a storage and retrieval grid. The service vehicle is configured for retrieving a remotely operated vehicle for service.

The service vehicle comprises:
- a first vehicle area in which the remotely operated vehicle can be received by the service vehicle while the remotely operated vehicle is still on the rail system, and
- a second vehicle area in which the remotely operated vehicle can be supported by the service vehicle for servicing.

The first vehicle area is configured as a vehicle pen for holding the remotely operated vehicle before entry to the second vehicle area, and wherein the first vehicle area is linked to the second vehicle area for passage of the remotely operated vehicle via the vehicle pen.

The vehicle pen comprises:
- an entry barrier to regulate entry of the remotely operated vehicle into the service vehicle and the vehicle pen, and
- an exit barrier on exit from the vehicle pen into the second vehicle area to regulate the passage of the remotely operated vehicle through the first vehicle area and into the second vehicle area.

The entry and exit barriers may comprise moveable barriers, each moveable between an open position in which it allows passage of the remotely operated vehicle, and a closed position in which it restricts passage of the remotely operated vehicle, and wherein the entry and exit barriers are regulated or controlled such that the entrance barrier can be opened only when the exit barrier is closed, and vice versa.

A remotely operated vehicle may be a container handling vehicle or a delivery vehicle for transport of containers. The remotely operated vehicle may operate on rails at different levels of the automated storage and retrieval grid.

The rail system of a storage and retrieval grid may be a container handling vehicle rail system onto which container handling vehicles operates by storing and retrieving storage containers, or the rail system may be a delivery rail system onto which delivery vehicles operates by transporting storage container between a storage grid and an access station.

A service vehicle may be a vehicle adapted to move on the rail system of the storage and retrieval grid by retrieving remotely operated vehicle for service. In the event the remotely operated vehicles cannot move by themselves towards a service area, the service vehicle may be arranged to collect the malfunctioning vehicle. The service vehicle may operate on the rail system by belt or by wheels. The service vehicle may be operated by a human operator sitting in the service vehicle.

The service vehicle comprises a vehicle pen comprising an entry and/or exit barrier. The barriers may be moveable and may be at least any one of a: gate, door, or sliding wall, and the exit barrier may be a moveable bar.

The one or more moveable barriers may be connected to the service vehicle such that it may slide, be lifted, retracted, lowered or pivoted relative to the service vehicle, between the open position and the closed position.

An entry barrier in the form of a full-height gate, door, or sliding wall may provide a dual function of regulating the entry of the vehicle but also providing a safety barrier for the operator when he/she is working in the service area of the service vehicle.

In the case of the exit barrier, a less obtrusive structure like a bar or gate may be arranged to provide more room for servicing the remotely operated vehicle. It may need to be able to close easily once the vehicle is in to the second vehicle area. For example, a bar that pivots upwards and can be lowered down afterwards may be ideal.

The height of the barriers may generally be above the vehicle base for providing a barrier that can stop the vehicle easily. As for the entry barrier, it may have the dual function of providing a safety barrier, and in the case of the exit barrier it needs to be of a height to open over the height of the rest of the vehicle base.

A remotely operated vehicle may be received into the vehicle pen in the first vehicle area when the entry barrier is open, in such case and according to the invention, the exit barrier is closed, preventing the remotely operated vehicle to move uncontrollably into the second vehicle area.

The remotely operated vehicle may move into the first vehicle area under self-propulsion, or the service vehicle may move or position itself relative to the remotely operated vehicle such that said vehicle enters into the first vehicle area. While inside the vehicle pen of the first vehicle area, the entrance barrier closes and the exit barrier opens, allowing the vehicle to enter into the second vehicle area.

The remotely operated vehicle may self-propel into the second vehicle area, or the remotely operated vehicle may be shut down and move into the second vehicle area by assistance from the human operator or through assistance from handling equipment on the service vehicle.

The human operator may thus have access to the remotely operated vehicle while it is located in the vehicle pen, such that the remotely operated vehicle may be shut down and/or handled.

The service vehicle may comprise a partition for separating a human operator area from the first and second vehicle areas. The partition may comprise at least one gate, door or sliding wall for a human operator to move between the human operator area and the second vehicle area.

The partition may be walls arranged at the perimeter of the service vehicle. The walls may be transparent for the operator to easy see through. The partition may comprise at least any one of a wall, fence or structure.

The service vehicle may comprise a vehicle base with motorized wheels arranged to move the vehicle in a first lateral direction (X) and a second lateral direction (Y) of the rail system.

The vehicle base may comprise one single unit with motorized wheels arranged to move the vehicle in a first lateral direction (X) and a second lateral direction (Y) of the rail system.

The vehicle base may have a footprint corresponding in area to a size of a storage grid cell such that two or more vehicle base may be connected and move as one unit on the rail system, in both X- and Y-direction.

The vehicle base may comprise a plurality of wheel modules, each wheel module having a first set of wheels configured to move the service vehicle along the first lateral direction (X) of the rail system and a second set of wheels configured to move the service vehicle along the second lateral direction (Y) of the rail system, the second direction (Y) being perpendicular to the first direction (X).

The wheel modules may be configured to work together as one master wheel module and one or more slave wheel modules.

The height of each wheel module may be shallow compared to the height of a remotely operated vehicle they are rescuing. Their height may be around 30-50% of the height of a remotely operated vehicle. The height of the wheel module provides a good working height for the human operator when servicing a malfunctioning remotely operated vehicle.

The rectangular footprint of the service vehicle may be missing a wheel module to provide the vehicle pen for the remotely operated vehicle.

The footprint the wheel modules may provide a recess which creates a "dock" or "bay" in which to land the remotely operated vehicle within the perimeter of the service vehicle. The sides of the three neighboring wheel modules present a low wall to stop the vehicle from moving uncontrollably towards an operator standing on the working platform of the vehicle base. The barriers of the vehicle pen work further to capture the remotely operated vehicle.

The first vehicle area might be seen as at rail height, and there the space is between a pair of wheel modules. For the second vehicle area, it may be at the height of the working platform on top of the vehicle base. The second vehicle area may also be on top of a wheel module.

The vehicle base of a service vehicle may comprise one or more vehicle module platforms arranged between the wheel modules. The vehicle module platforms are arranged to create necessary space for first and second vehicle area within the rectangular perimeter of the service vehicle. The driver cabin for the human operator may be provided by one or more vehicle module platforms arranged between two wheel modules.

The vehicle module platform may have a size that corresponds to the size of the vehicle module, and likewise to the size of a grid cell of the rails system, such that when provided on a service vehicle, the service vehicle will have a size corresponding to a number of grid cells such that the service vehicle can move in both X- and Y-direction on the rail system.

A number of different arrangements of wheel modules are possible. In case of a 3×3 vehicle, however, the position of the second vehicle area, may be generally in the middle of the service vehicle with access to the malfunctioning vehicle allowed to the human operator on both sides.

A floor panel may also be provided in the area of the vehicle pen. Once the remotely operated vehicle has made it to the second vehicle area and is being serviced, the floor panel may prevent the operator stepping through or dropping tools into the underlying storage containers.

The upper surface of the vehicle base or the upper surface of the one or more wheel modules, may provide a walking surface for the human operator.

The first vehicle area and the second vehicle area may be located between at least a pair of wheel modules. The human operator may have access to the remotely operated vehicle in the first or second vehicle area when standing on the walking surface.

The first vehicle area may be at a rail height, and there the space is between a pair of wheel modules. The second vehicle area may be at the height of a working platform above the rail height. The second vehicle area may also be on top of a wheel module and positioned in plan between two wheel modules either side.

The second vehicle area may comprise a working platform or a vehicle support for supporting the one or more remotely operated vehicles such that the wheels are raised above the rail system. In this way the human operator may be able to service the malfunctioning vehicle or the malfunctioning vehicle may be transported to a service area for service.

The vehicle support may be a platform onto which the one or more remotely operated vehicles can move. The platform may be provided with lifting and tilting means so that the vehicle may easily move onto the platform from the rails. The service vehicle may also be provided with a winch such that the remotely operated vehicle can be pulled onto the platform and secured.

A human operator may manually push the vehicles up into the second vehicle area from the first vehicle area, or there may be a drive on mechanical lift surface(s) that raises the remotely operated vehicle up to a working service height.

The vehicle pen may provide a holding zone for the remotely operated vehicle between the entrance and exit barriers that has length and/or width dimensions generally corresponding to those of the remotely operated vehicle.

A sensor may be arranged to register the position of the moveable barrier of the entry and exit barriers and communicates with an automated control system for regulating the movement of the moveable barriers.

The sensor may communicate with the automated control system for regulating the locking or closing when the barrier is open and unlocking or opening when the barrier is closed.

The sensor may be located on the wheel module adjacent the moveable barrier of the entrance and exit barrier. The sensors may be optical sensors detecting reflection of lights. Other or additional sensors for detecting the moveable gate may also be used, e.g. acoustic sensors or magnetic coded sensors. A sensor having a narrow beam may be advantageous for the signal it will need to output in order to provide a stronger peak/trough signal.

The entry and exit barriers may be configured to be remotely locked, unlocked, opened or closed by use of the automated control system.

The invention is also directed to a method of gaining access to a remotely operated vehicle using a service vehicle. The method comprises the step of:

moving the service vehicle across the rail system towards the remotely operated vehicle requiring service, optionally if the entry barrier is not already open, opening the entry barrier of the vehicle pen after being confirmed by one or more sensors, that the exit barrier is closed, moving the remotely operated vehicle past the entry barrier of the vehicle pen or moving the service vehicle such that the remotely operated vehicle passes the entry barrier of the vehicle pen to enter the vehicle pen, closing the entry barrier while the remotely operated vehicle is located in the vehicle pen, confirming that the entry barrier is in the closed or locked position, unlocking or opening the exit barrier, moving the remotely operated vehicle past the exit barrier and into the second vehicle area of the service vehicle, and optionally closing the exit barrier.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
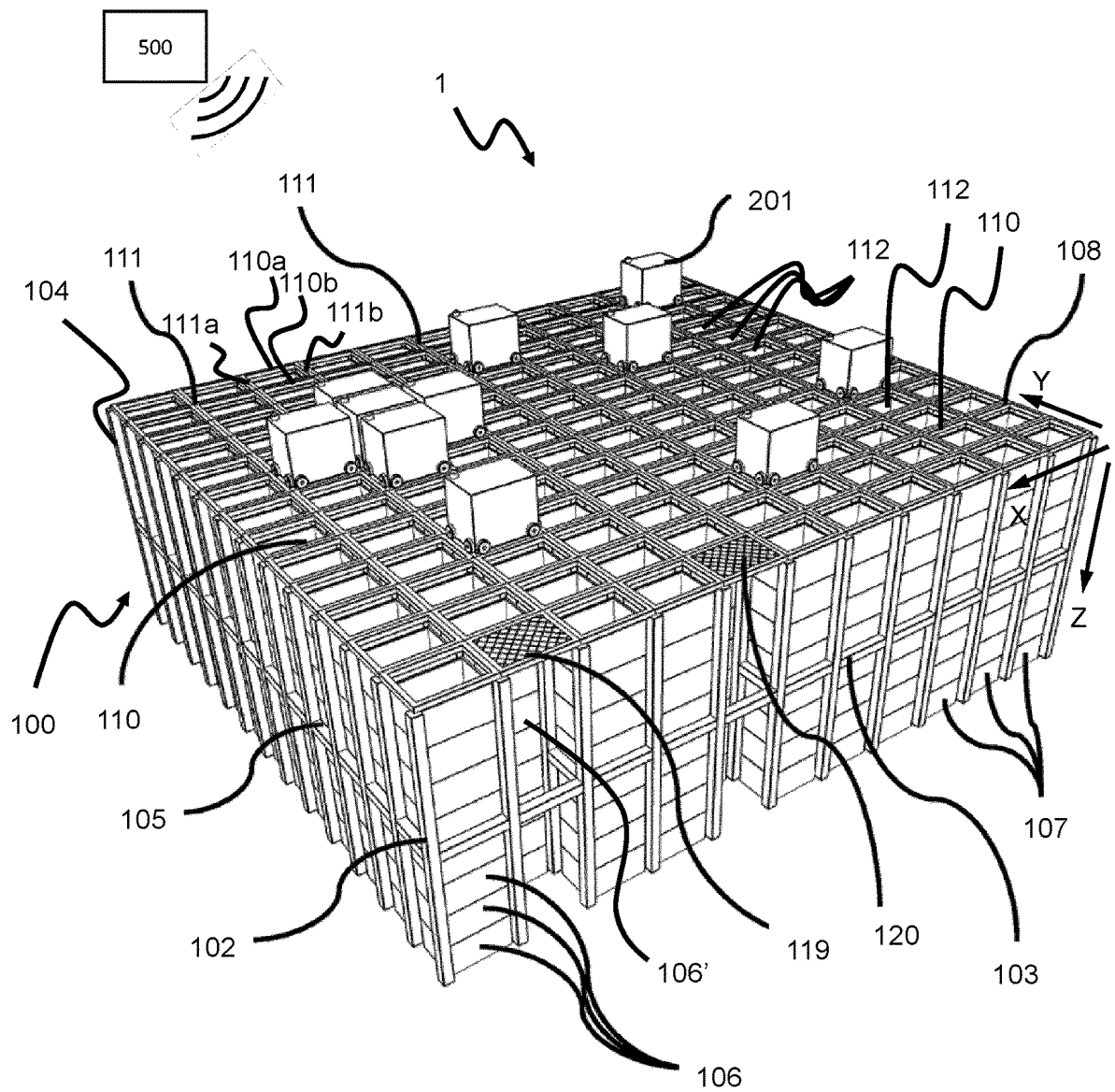
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
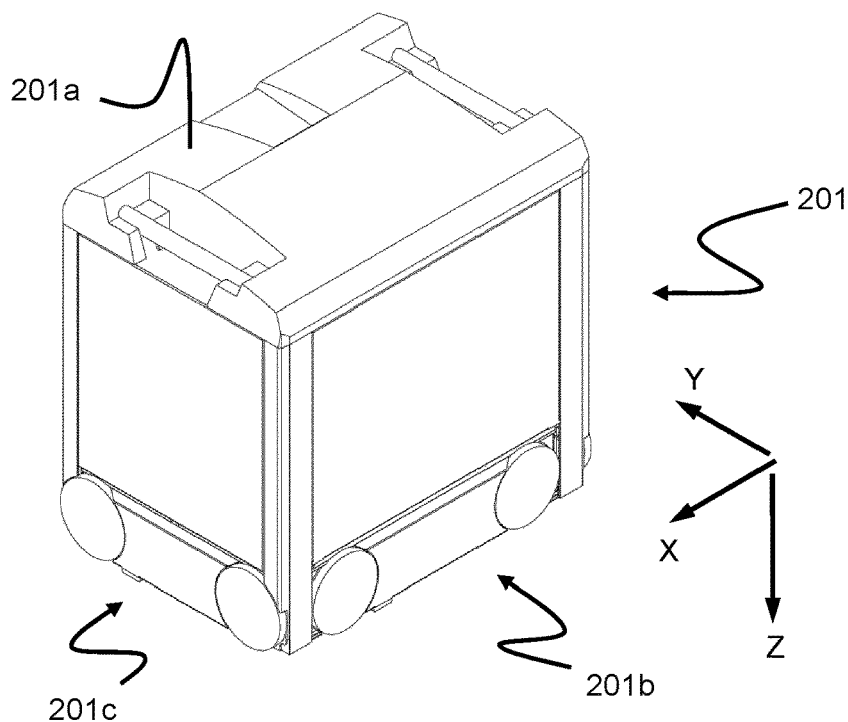
FIG. 2 is a perspective view of a prior art container handling vehicle having a centrally arranged cavity for carrying storage containers therein.
Figure 3:
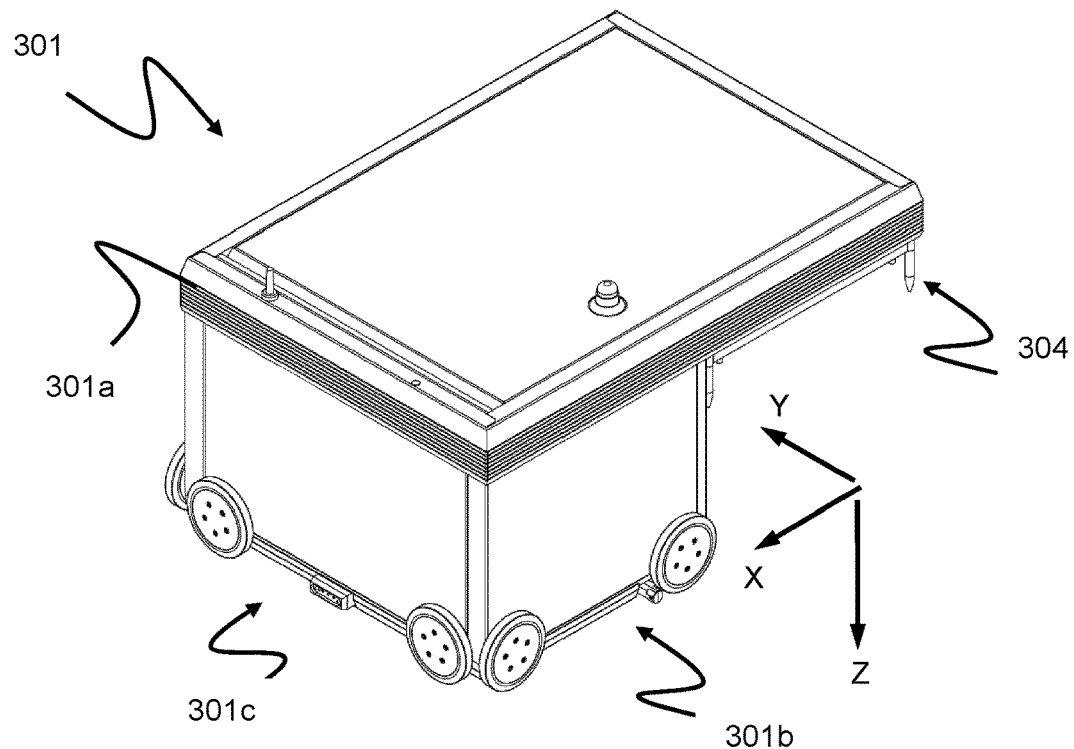
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the service vehicle 50 according to the invention will now be discussed in more detail with reference to FIGS. 4-8.

Figure 4:
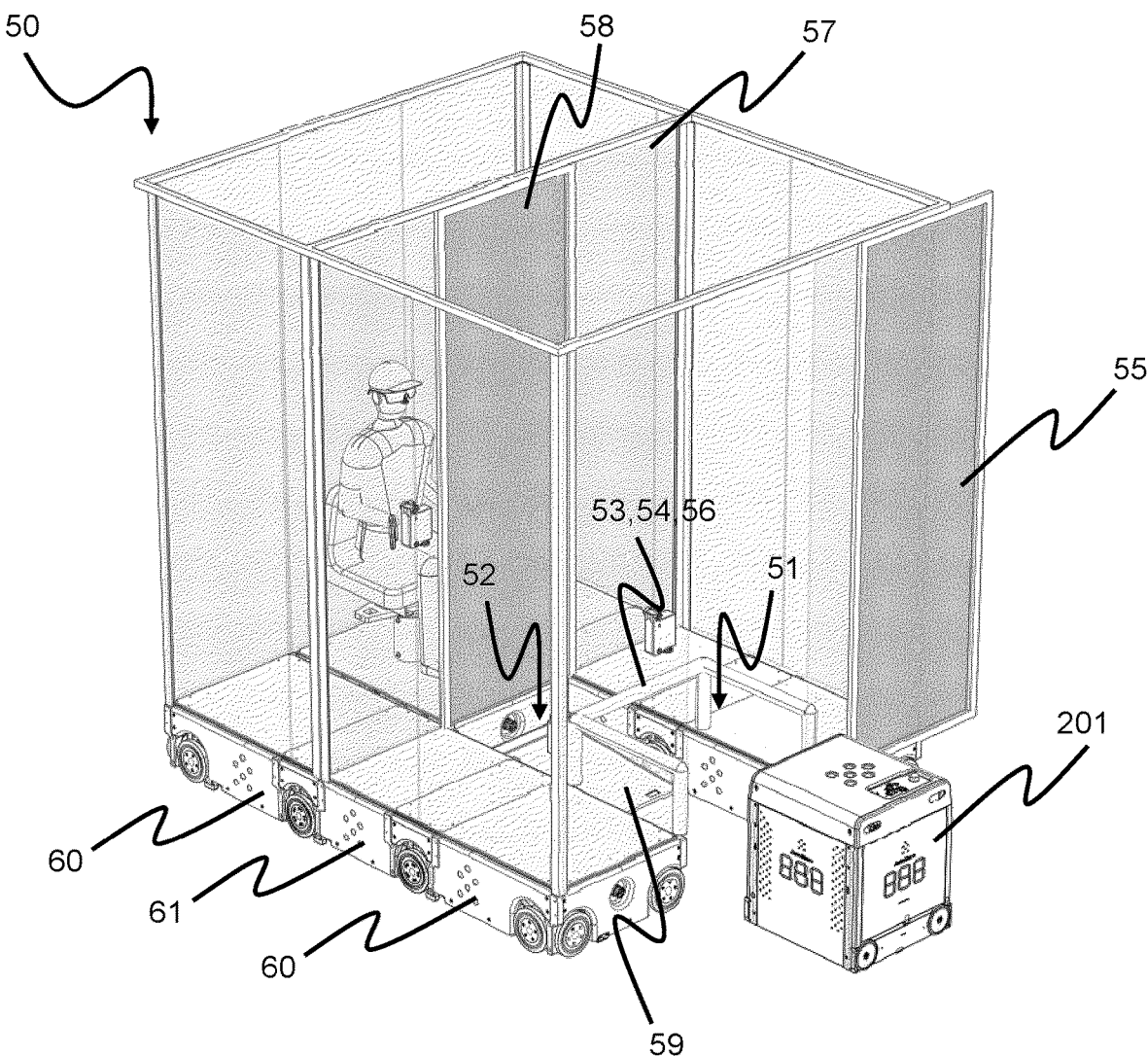
FIG. 4 shows a service vehicle moving towards a malfunctioning remotely operated vehicle located on a rail system (not shown).

FIG. 4 shows a service vehicle 50 according to a preferred embodiment of the present invention. The service vehicle is arranged for operating on a rail system of a storage and retrieval grid (not shown). The rail system may be a container handling vehicle rail system or a delivery vehicle rail system onto which a plurality of remotely operated vehicles 201,301 operate.

The service vehicle 50 is configured for retrieving and/or receiving a remotely operated vehicle 201,301 for service. As shown in FIG. 4, the remotely operated vehicle 201 is a container handling vehicle 201 adapted to move on a rail system (not shown) located above storage columns 105 where the storage containers 106 are stackable in stacks 107.

If a remotely operated vehicle 201 is malfunctioning and not able to self-propel itself towards a service area, the service vehicle 50 with a human operator may move onto the rail system 108 to collect or provide service to the malfunctioning vehicle 201.

The service vehicle 50 comprises a first vehicle area 51 in which the container handling vehicle 201 can be received by the service vehicle 50 while the container handling vehicle 201 is still on the rail system 108, and a second vehicle area 52 in which the container handling vehicle 201 can be supported by the service vehicle 50 for servicing.

The first vehicle area 51 is configured as a vehicle pen 53 for holding the container handling vehicle 201 before entry (i.e., a controlled entry) to the second vehicle area 52, and wherein the first vehicle area 51 is linked to the second vehicle area 52 for passage of the container handling vehicle 201 via the vehicle pen 53.

The vehicle pen 53 comprises an entry barrier 55 to allow entry of the container handling vehicle 201 into the service vehicle 50 and the vehicle pen 53, and an exit barrier 56 on exit from the vehicle pen into the second vehicle area 52 to regulate the passage of the container handling vehicle 201 through the first vehicle area 51 and into the second vehicle area 52.

Figure 5:
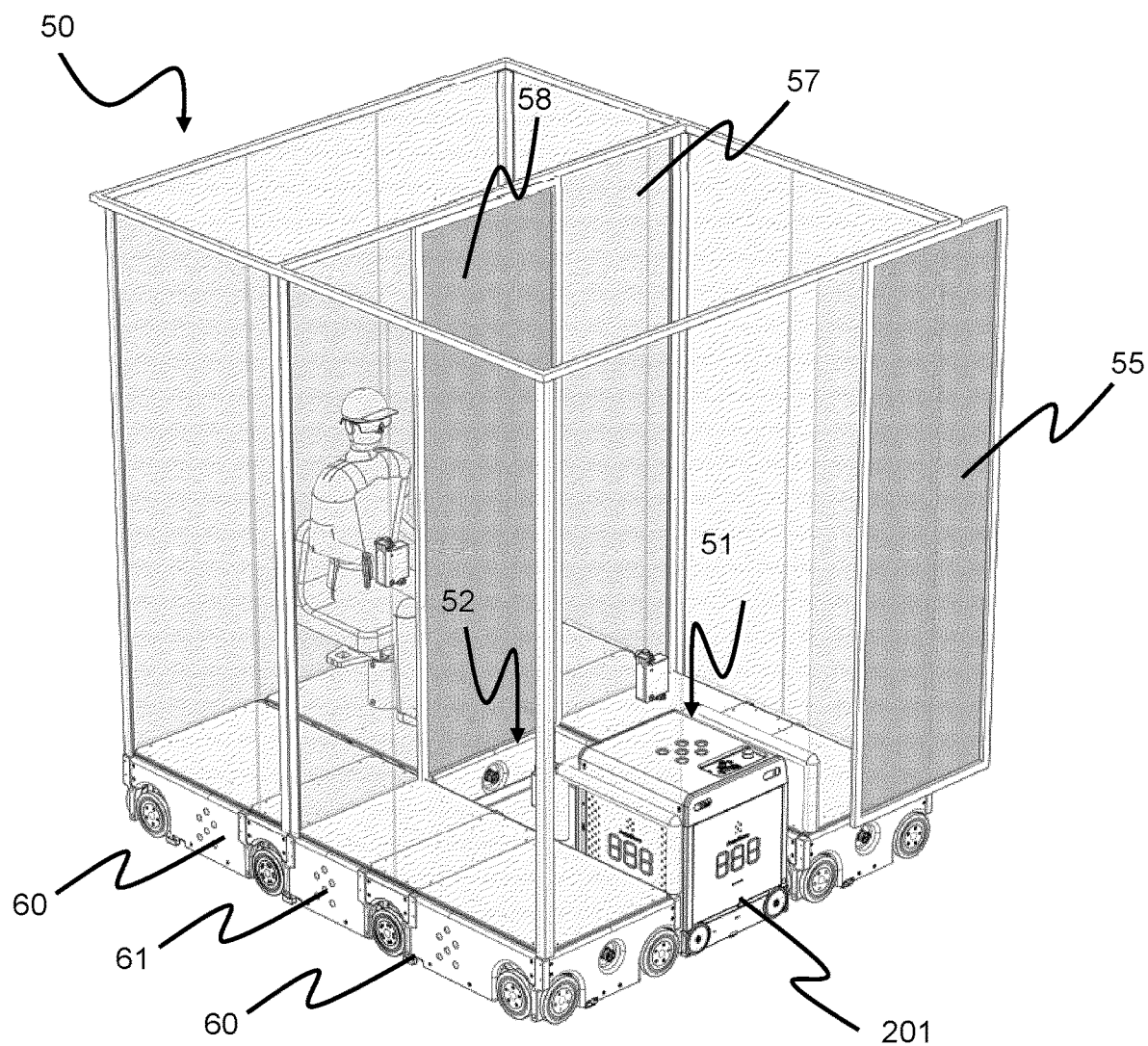
FIG. 5 shows a service vehicle with a remotely operated vehicle located in the first vehicle area.
Figure 6:
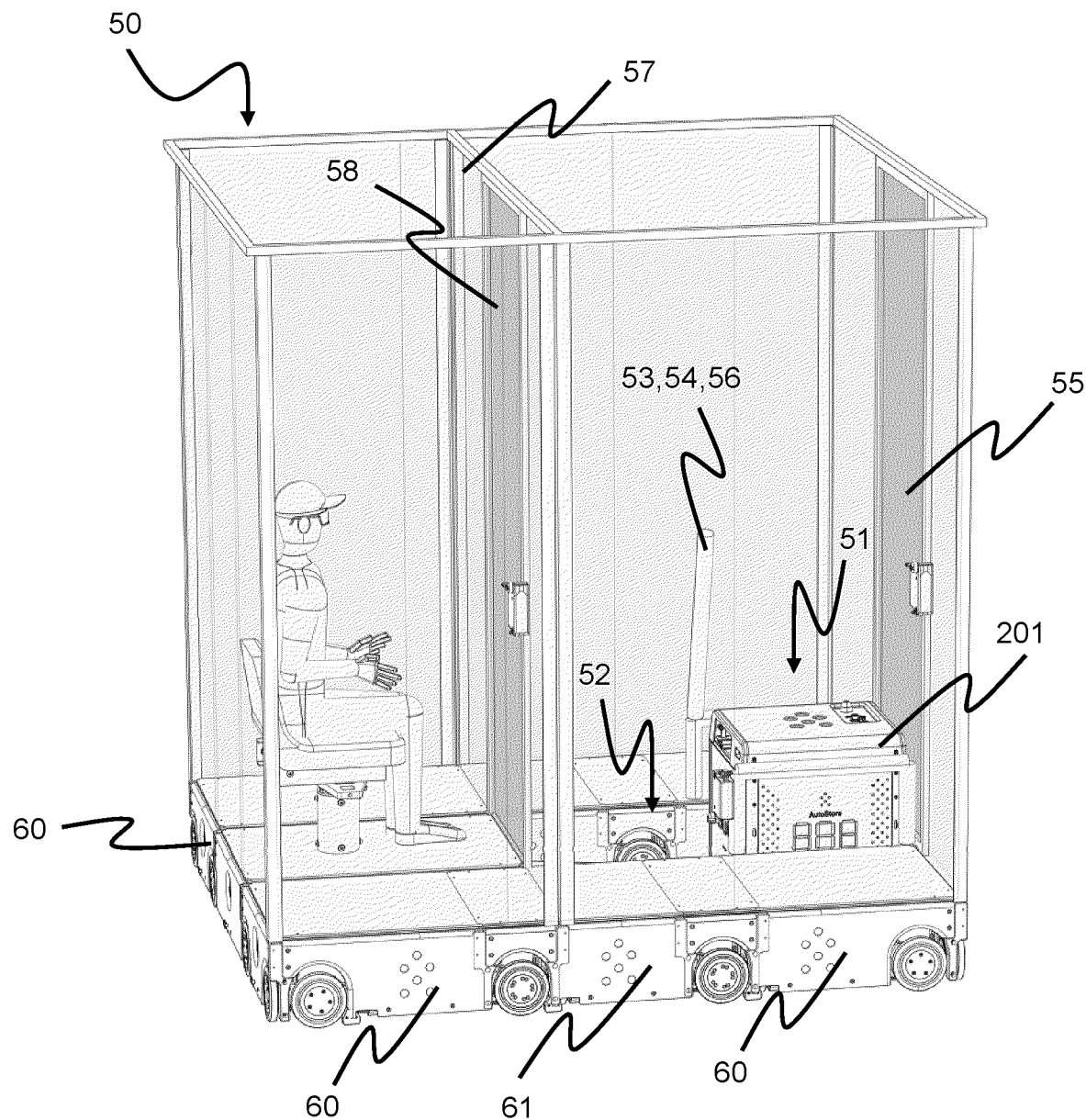
FIG. 6 shows a service vehicle with a remotely operated vehicle located in the first vehicle area, and where the entry barrier of the service vehicle is in the closed position.
Figure 7:
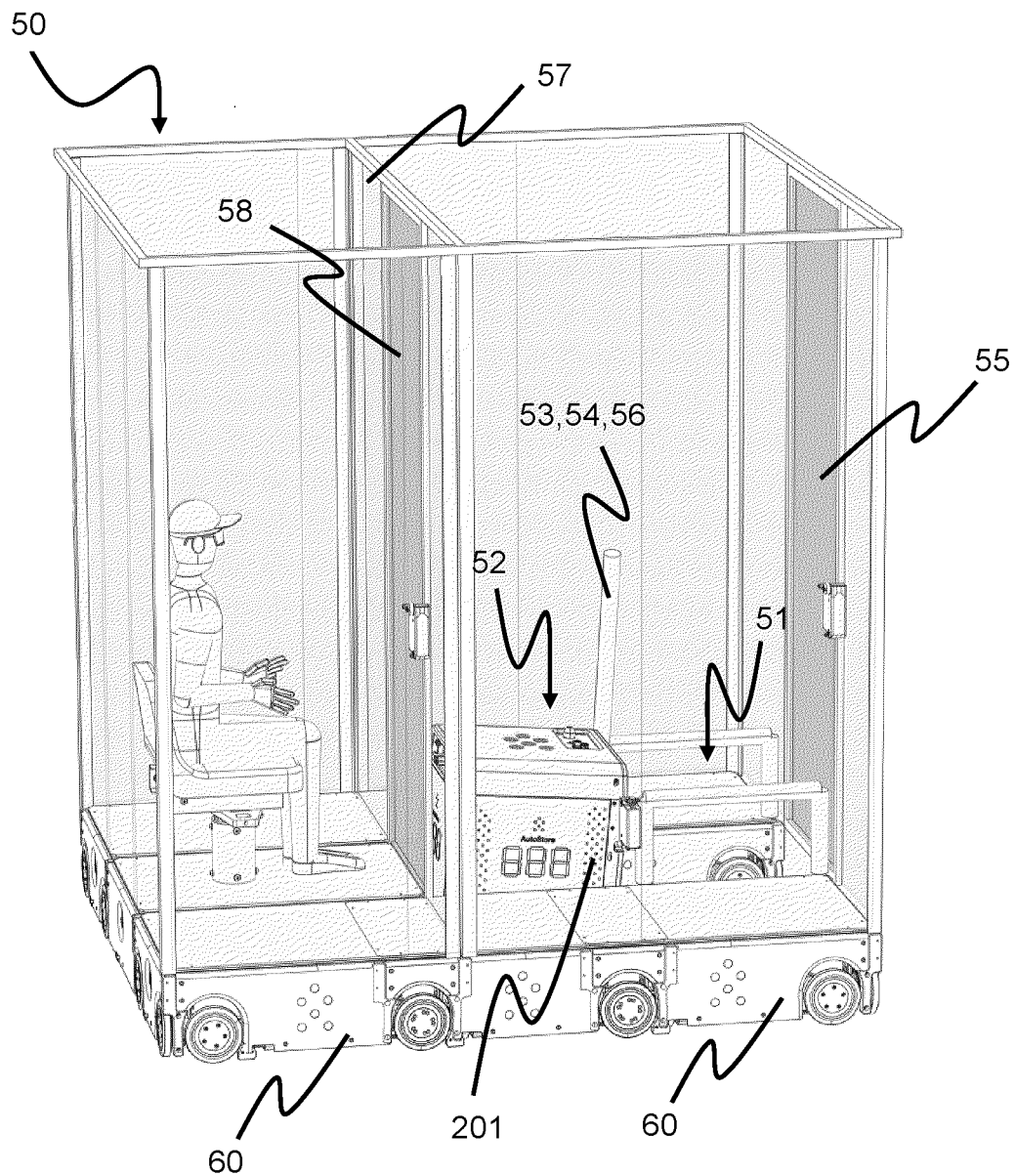
FIG. 7 shows the remotely operated vehicle in a second location of the second vehicle area.

FIG. 5 shows the container handling vehicle 201 having entered into the first vehicle area 51 after gaining entry through the entry barrier 55 which is a moveable door 55. The moveable door may slide open such that it allows the container handling vehicle to be received into the first vehicle area 51. The exit barrier 56 which is a moveable bar 56 prevents the container handling vehicle 201 from moving into or being received further into the second vehicle area 52.

The entry and exit barriers 55,56 may be adapted to be moveable between an open position in which it allows passage of the container handling vehicle 201, and a closed position in which it restricts passage of the container handling vehicle 201, and wherein the entry and exit barriers 55,56 are regulated such that the entrance barrier 55 can be opened only when the exit barrier 56 is closed, and vice versa. This is to prevent the container handling vehicle from moving unintentionally from one area to another.

As shown in FIGS. 4-10, the service vehicle 50 comprises a partition 57 such as walls, for separating a human operator area from the first and second vehicle areas 51,52. The walls 57 may be arranged at the perimeter of the service vehicle 50. The partition 57 may comprise a sliding door 58, arranged such that it allows the human operator to enter the first and second vehicle area 51,52.

The service vehicle 50 comprises a vehicle base with motorized wheels arranged to move the vehicle in a first lateral direction (X) and a second lateral direction (Y) of the rail system 108.

Figure 8:
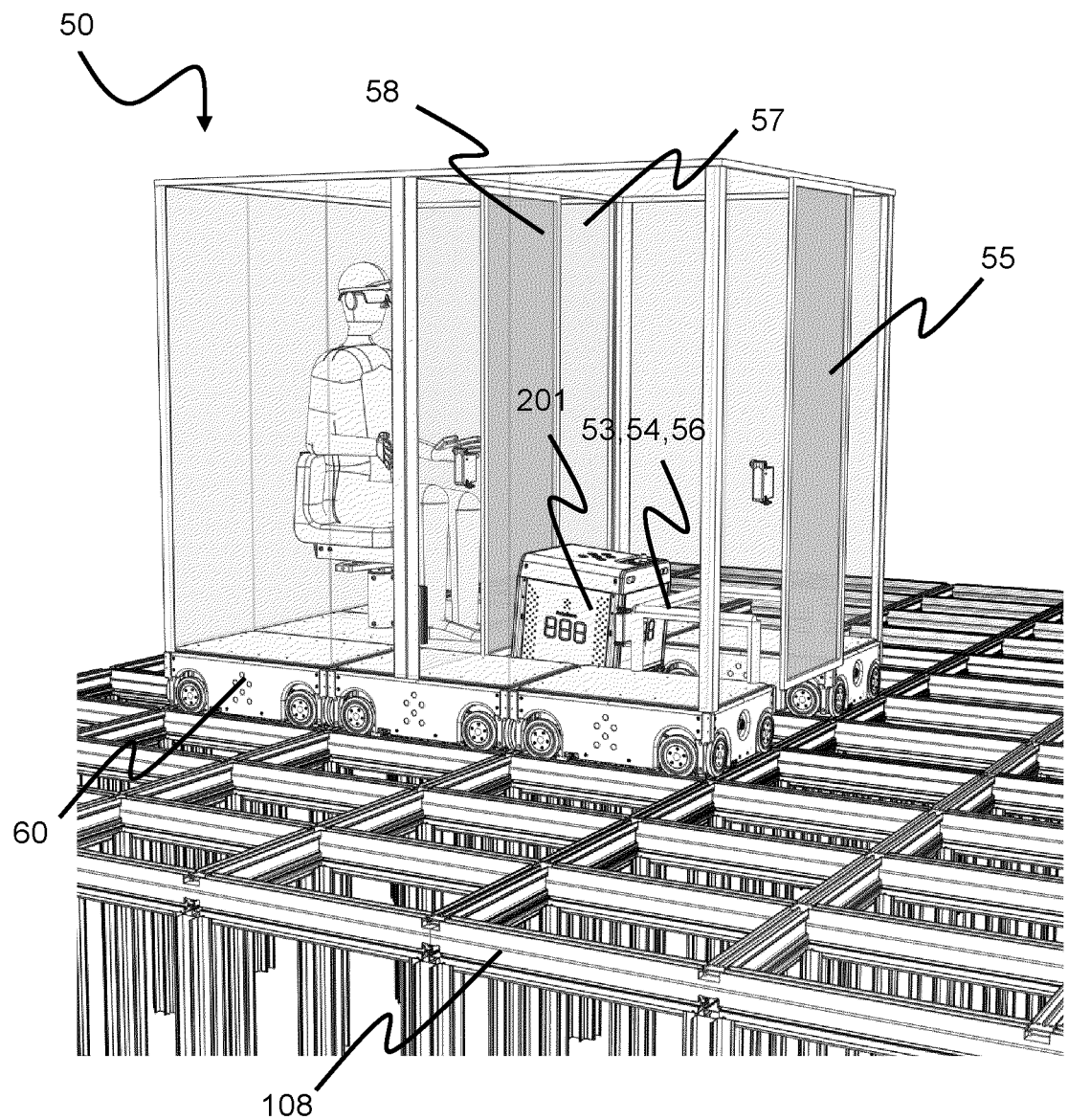
FIG. 8 shows a service vehicle on a rail system and wherein the remotely operated vehicle is in the second location of the second vehicle area.
Figure 9:
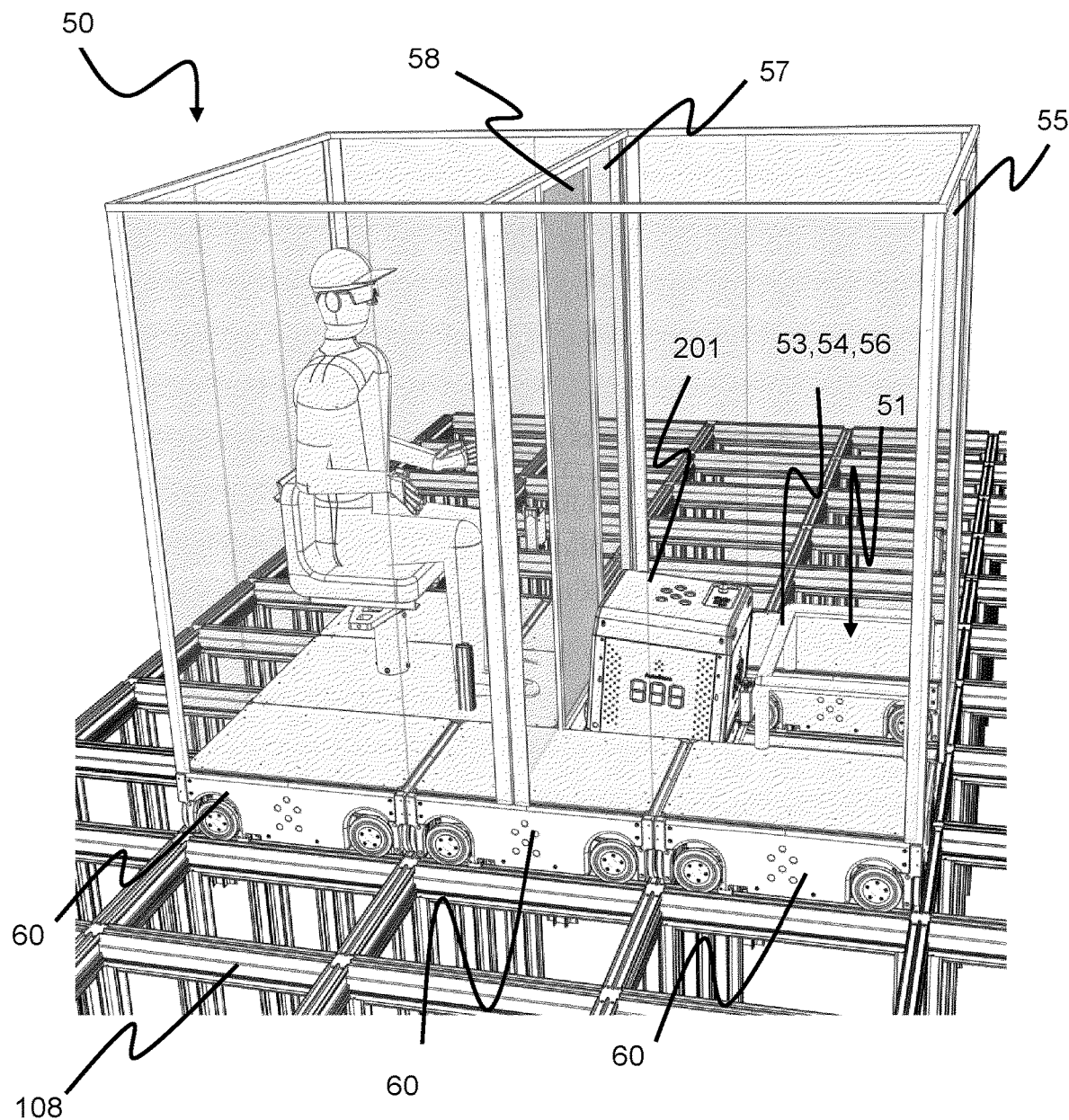
FIGS. 9-10 shows different views of the embodiment in FIG. 8.
Figure 10:
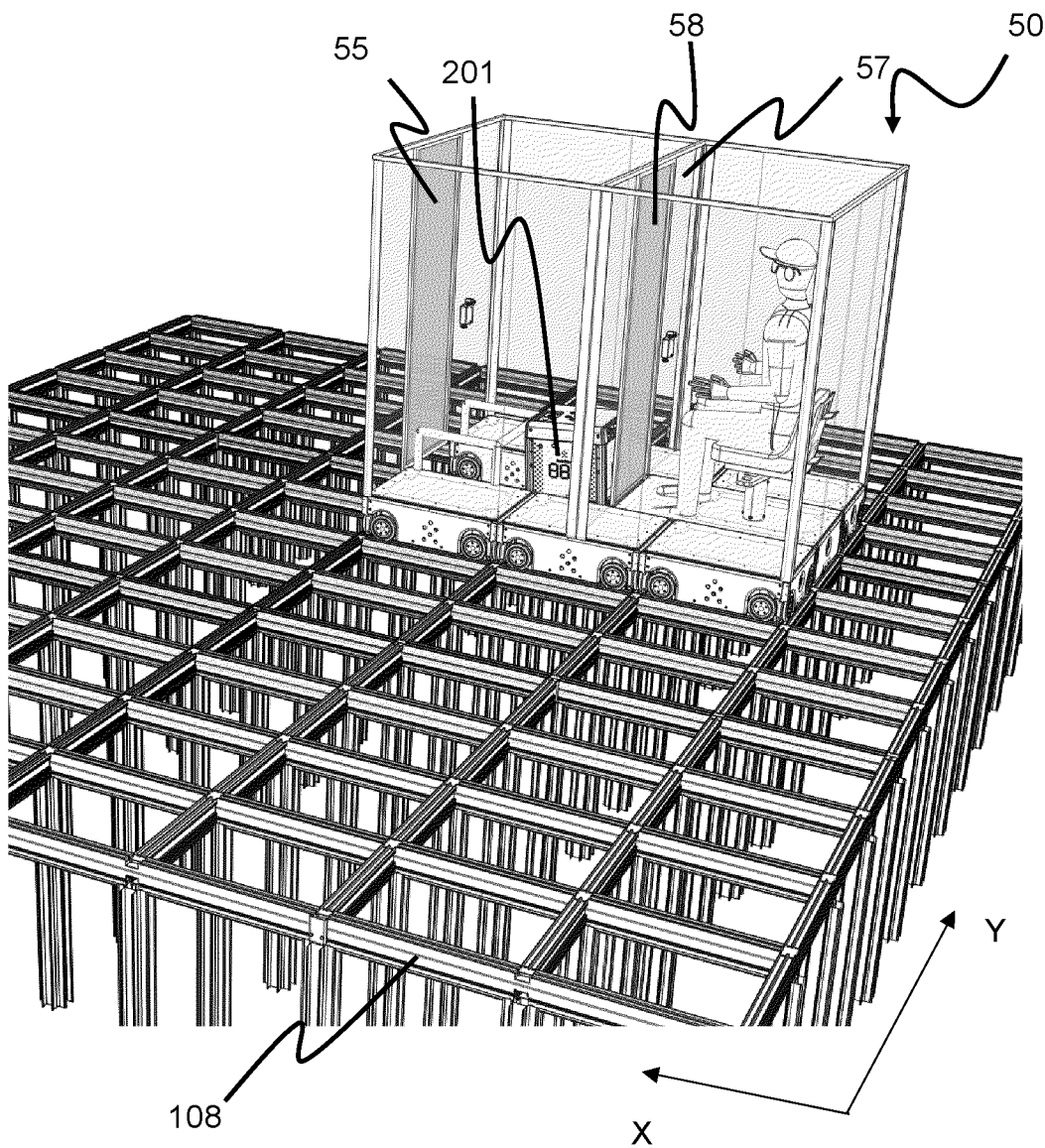

As shown in FIG. 8-10, the vehicle base comprises a plurality of wheel modules 60, each wheel module 60 having a first set of wheels configured to move the service vehicle along the first lateral direction (X) of the rail system 108 and a second set of wheels configured to move the service vehicle along the second lateral direction (Y) of the rail system 108, the second direction (Y) being perpendicular to the first direction (X).

Each of the wheel modules 60 may have a similar size and footprint as for those of the grid cell of the rail system 108, such that the service vehicle may move on the rail system 108 in both X- and Y-direction.

The wheel modules 60 may correspond to the width to that of the malfunctioning vehicle 201 such that the malfunctioning vehicle may be received into the first vehicle area 51 of the service vehicle 50.

The rectangular footprint of the service vehicle 50 may be arranged such that it is missing one or more wheel module 60 to provide the first and optionally second vehicle areas 51,52 of the service vehicle 50. The area of the missing wheel modules 60 provides a recess which creates a "dock" or "bay" in which to land the remotely operated vehicle 201,301 within the perimeter of the service vehicle 50.

The sides of the wheel modules may present a low wall to stop the vehicle 201,301 from moving uncontrollably towards an operator standing on the working platform of the vehicle base. The barriers 55,56 of the vehicle pen work further to capture the remotely operated vehicle 201,301.

Different arrangements of wheel modules 60 are possible. In this case of the 3×3 vehicle shown in FIGS. 8-10, however, the position of the second vehicle area, generally in the middle of the service vehicle with access to the robot allowed to the human operator on both sides may be advantageous.

The upper surface of the wheel modules 60 or the vehicle base, may provide a walking surface for the human operator.

As shown in FIG. 4-7, the vehicle base of a service vehicle 50 may comprise one or more vehicle module platforms 61 arranged between the wheel modules 60 to provide additional space for the first and second area. The driver cabin for the human operator may be provided by one or more vehicle module platforms 61.

The vehicle module platform 61 may have a size corresponding to those of the size of the vehicle base or the wheel modules 60, such that the vehicle module platform 61 may replace a wheel module 60.

In FIG. 8-10, a wheel module 60 is arranged between two wheel modules 60 such that there are three wheel modules 60 arranged one after another. In FIG. 4-7 the center wheel module 60 is replaced by a vehicle module platform 61, allowing a simpler construction with less wheels but having the same footprint.

The second vehicle area 52 may comprise a vehicle support for supporting the one or more remotely operated vehicles 201,301 such that the wheels are raised above the rail system 108. This allows the vehicle 201,301 to be carried by the service vehicle 50 and further to be moved to a service area.

The support may be a platform 59 onto which the remotely operated vehicle can be pushed, dragged or lifted onto.

LIST OF REFERENCE NUMBERS

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction
50 Service vehicle
51 First vehicle area
52 Second vehicle area
53 Vehicle pen
54 Moveable barrier
55 Entry barrier
56 Exit barrier
57 Partition
58 Sliding door
59 Platform
60 Wheel modules
61 Vehicle module platform
109 Central computer system

The invention claimed is:

1. A service vehicle for operating on a rail system of a storage and retrieval grid, the service vehicle being configured for retrieving a remotely operated vehicle for service, wherein the service vehicle comprises:
   a first vehicle area in which the remotely operated vehicle can be received by the service vehicle while the remotely operated vehicle is still on the rail system, and
   a second vehicle area in which the remotely operated vehicle can be supported by the service vehicle for servicing,
   wherein the first vehicle area is configured as a vehicle pen for holding the remotely operated vehicle before entry to the second vehicle area, and wherein the first vehicle area is linked to the second vehicle area for passage of the remotely operated vehicle via the vehicle pen,
   wherein the vehicle pen comprises:
      an entry barrier to regulate entry of the remotely operated vehicle into the service vehicle and the vehicle pen, and
      an exit barrier on exit from the vehicle pen into the second vehicle area to regulate the passage of the remotely operated vehicle through the first vehicle area and into the second vehicle area,
   wherein the entry and exit barriers comprise moveable barriers, each moveable between an open position in which the moveable barrier allows passage of the remotely operated vehicle, and a closed position in which the moveable barrier restricts passage of the remotely operated vehicle, and wherein the entry and exit barriers are regulated such that the entry barrier can be opened only when the exit barrier is closed, and vice versa.

2. The service vehicle according to claim 1, wherein the entry barrier is at least any one of a gate, door, or sliding wall, and the exit barrier is a moveable bar.

3. The service vehicle according to claim 1, wherein the service vehicle comprises a partition for separating a human operator area from the first and second vehicle areas.

4. The service vehicle according to claim 3, wherein the partition comprises at least one gate, door or sliding wall for a human operator to move between the human operator area and the second vehicle area.

5. The service vehicle according to claim 1, wherein the service vehicle comprises a vehicle base with motorized wheels arranged to move the vehicle in a first lateral direction and a second lateral direction of the rail system.

6. The service vehicle according to claim 5, wherein the vehicle base comprises a plurality of wheel modules, each wheel module having a first set of wheels configured to move the service vehicle along the first lateral direction of the rail system and a second set of wheels configured to move the service vehicle along the second lateral direction of the rail system, the second direction being perpendicular to the first direction.

7. The service vehicle according to claim 6, wherein the wheel modules are configured to work together as one master wheel module and one or more slave wheel modules.

8. The service vehicle according to claim 6, wherein an upper surface of the wheel modules provides a walking surface for a human operator.

9. The service vehicle according to claim 6, wherein the first vehicle area and the second vehicle area are each located between at least a pair of wheel modules.

10. The service vehicle according to claim 1, wherein the second vehicle area comprises a vehicle support for supporting one or more remotely operated vehicles such that wheels are raised above the rail system.

11. The service vehicle according to claim 10, wherein the vehicle support is a platform onto which the one or more remotely operated vehicles can move.

12. The vehicle according to claim 1, wherein the vehicle pen provides a holding zone for the remotely operated vehicle between the entry and exit barriers that has length and/or width dimensions corresponding to those of the remotely operated vehicles.

13. The vehicle according to claim 12, wherein the entry and exit barriers are configured to be remotely locked, unlocked, opened or closed by use of an automated control system.

14. A method of gaining access to a remotely operated vehicle using a service vehicle for operating on a rail system of a storage and retrieval grid, the service vehicle being configured for retrieving a remotely operated vehicle for service, wherein the service vehicle comprises:
a first vehicle area in which the remotely operated vehicle can be received by the service vehicle while the remotely operated vehicle is still on the rail system, and
a second vehicle area in which the remotely operated vehicle can be supported by the service vehicle for servicing,
wherein the first vehicle area is configured as a vehicle pen for holding the remotely operated vehicle before entry to the second vehicle area, and wherein the first vehicle area is linked to the second vehicle area for passage of the remotely operated vehicle via the vehicle pen,
wherein the vehicle pen comprises:
an entry barrier to regulate entry of the remotely operated vehicle into the service vehicle and the vehicle pen, and
an exit barrier on exit from the vehicle pen into the second vehicle area to regulate the passage of the remotely operated vehicle through the first vehicle area and into the second vehicle area, wherein the entry and exit barriers comprise moveable barriers, each moveable between an open position in which the moveable barrier allows passage of the remotely operated vehicle, and a closed position in which the moveable barrier restricts passage of the remotely operated vehicle, and wherein the entry and exit barriers are regulated such that the entry barrier can be opened only when the exit barrier is closed, and vice versa, wherein the method comprises:
moving the service vehicle across the rail system towards the remotely operated vehicle requiring service,
opening the entry barrier of the vehicle pen after being confirmed by one or more sensors, that the exit barrier is closed,
moving the remotely operated vehicle past the entry barrier of the vehicle pen or moving the service vehicle such that the remotely operated vehicle passes the entry barrier of the vehicle pen to enter the vehicle pen,
closing the entry barrier while the remotely operated vehicle is located in the vehicle pen,
confirming by means of the one or more sensors that the entry barrier is in the closed or locked position,
unlocking or opening the exit barrier,
moving the remotely operated vehicle past the exit barrier and into the second vehicle area of the service vehicle, and
closing the exit barrier.

\* \* \* \* \*